US012691830B2

(12) United States Patent
Son et al.

(10) Patent No.: US 12,691,830 B2
(45) Date of Patent: Jul. 28, 2026

(54) SLIDING-TYPE GLOVE BOX

(71) Applicants: KBI DONGKOOK IND. CO., LTD., Seoul (KR); HYUNDAI MOBIS CO., LTD., Seoul (KR)

(72) Inventors: Dong Il Son, Ulsan (KR); Dong Yong Choi, Gyeonggi-do (KR); Chang Bok Park, Gyeonggi-do (KR); Ie Seob Park, Gyeonggi-do (KR)

(73) Assignees: Hyundai Mobis Co., LTD., Seoul (KR); KBI DONGKOOK IND. CO., LTD., Seoul (KR)

( * ) Notice: Subject to any disclaimer, the term of this patent is extended or adjusted under 35 U.S.C. 154(b) by 353 days.

(21) Appl. No.: 18/550,721

(22) PCT Filed: Mar. 15, 2022

(86) PCT No.: PCT/KR2022/003554
§ 371 (c)(1),
(2) Date: Sep. 15, 2023

(87) PCT Pub. No.: WO2022/197051
PCT Pub. Date: Sep. 22, 2022

(65) Prior Publication Data
US 2024/0190355 A1 Jun. 13, 2024

(30) Foreign Application Priority Data
Mar. 17, 2021 (KR) ........................ 10-2021-0034805

(51) Int. Cl.
*B60R 7/06* (2006.01)
*B60R 7/04* (2006.01)

(52) U.S. Cl.
CPC ...................................... *B60R 7/06* (2013.01)

(58) Field of Classification Search
None
See application file for complete search history.

(56) References Cited

U.S. PATENT DOCUMENTS

2016/0176351 A1* 6/2016 Gillis ........................ B60R 7/06
296/37.8
2022/0153203 A1 5/2022 Son et al.

FOREIGN PATENT DOCUMENTS

CN 104044515 B 12/2017
EP 2 397 370 B1 3/2013
(Continued)

OTHER PUBLICATIONS

Directindustry.com, https://www.bing.com, Sep. 16, 2019 (Year: 2019).*
(Continued)

*Primary Examiner* — Hung Q Dang
(74) *Attorney, Agent, or Firm* — Eschweiler & Potashnik, LLC; Harris Kim

(57) ABSTRACT

Proposed is a sliding-type glove box including a housing mounted in a dashboard, a pair of rail parts provided in an inner space of the housing, and a storing part capable of being pulled out in a sliding manner by being moved along the rail parts. Each of the rail parts includes an outer rail mounted on the housing, an inner rail connected to a bottom portion of the storing part and provided such that the inner rail is capable of being moved along the outer rail. Furthermore, a stopper limiting a moving distance of the storing part is detachably provided on the outer rail.

8 Claims, 11 Drawing Sheets

(56)  References Cited

FOREIGN PATENT DOCUMENTS

| | | | |
|---|---|---|---|
| FR | 3100503 | A1 | 3/2021 |
| JP | 2011-201471 | A | 10/2011 |
| KR | 100523581 | B1 | 10/2005 |
| KR | 10-0693937 | B1 | 3/2007 |
| KR | 10-1209950 | B1 | 12/2012 |
| KR | 10-2014-0113417 | A | 9/2014 |
| KR | 10-2082171 | B1 | 2/2020 |
| KR | 10-2022-0014733 | A | 2/2022 |
| WO | 2021024826 | A1 | 2/2021 |

OTHER PUBLICATIONS

Extended European Search Report dated Feb. 7, 2025, Application No. 22771717.0; 10 pages.
International Search Report for corresponding International Application No. PCT/KR2022/003554 mailed Jun. 23, 2022.
Written Opinon for corresponding International Application No. PCT/KR2022/003554 dated Jun. 23, 2022.

* cited by examiner 110           100         130

[FIG. 7]
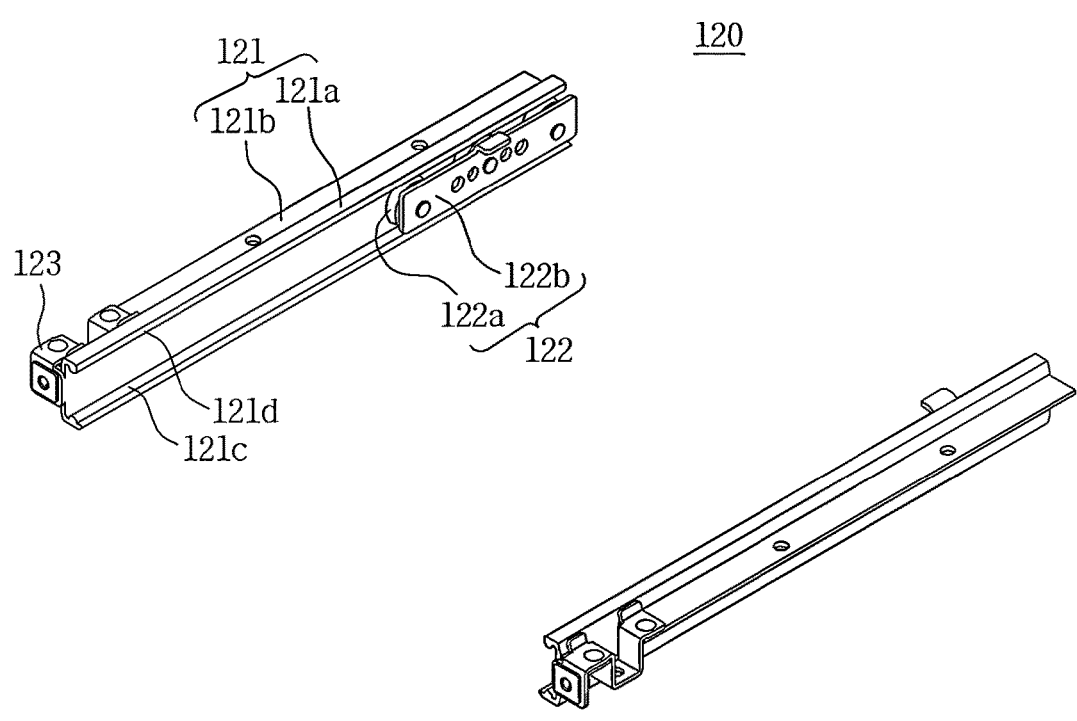

[FIG. 8]
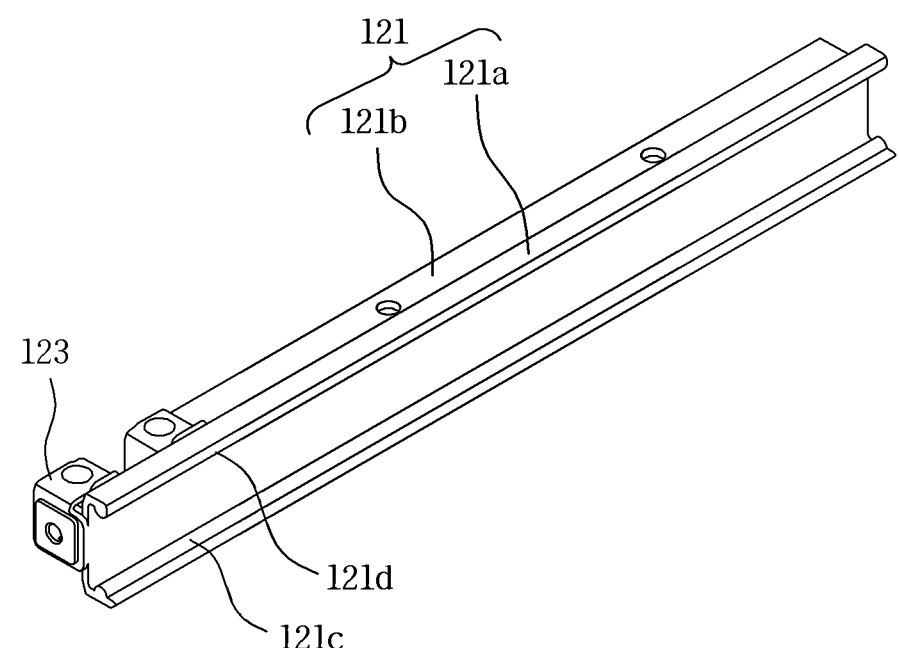

[FIG. 9]
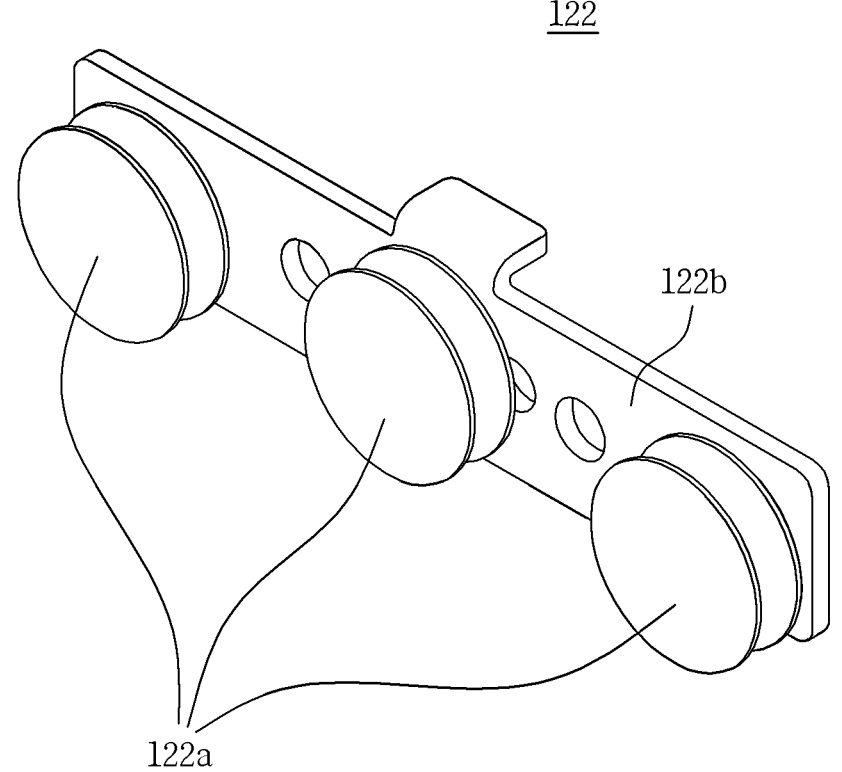

[FIG. 10]
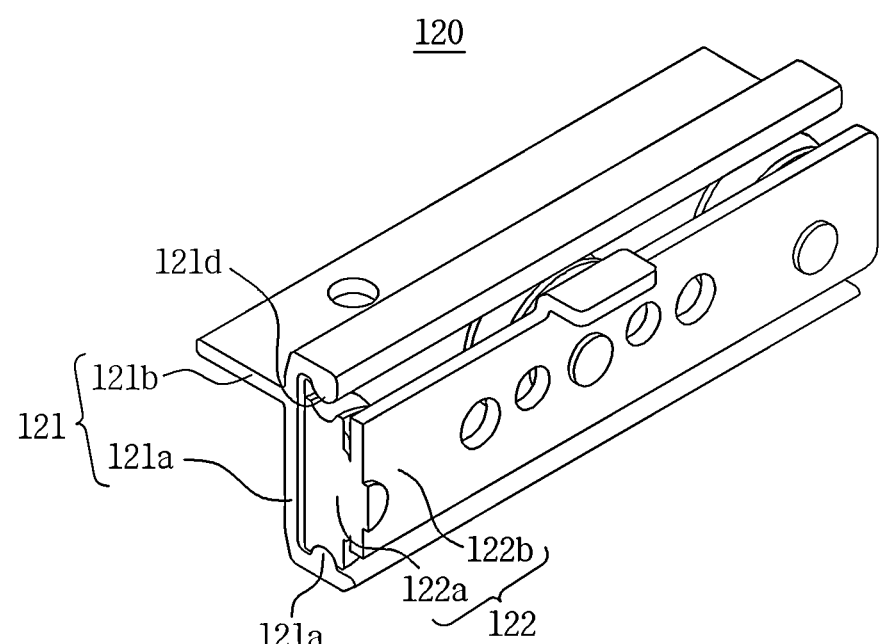

[FIG. 11]
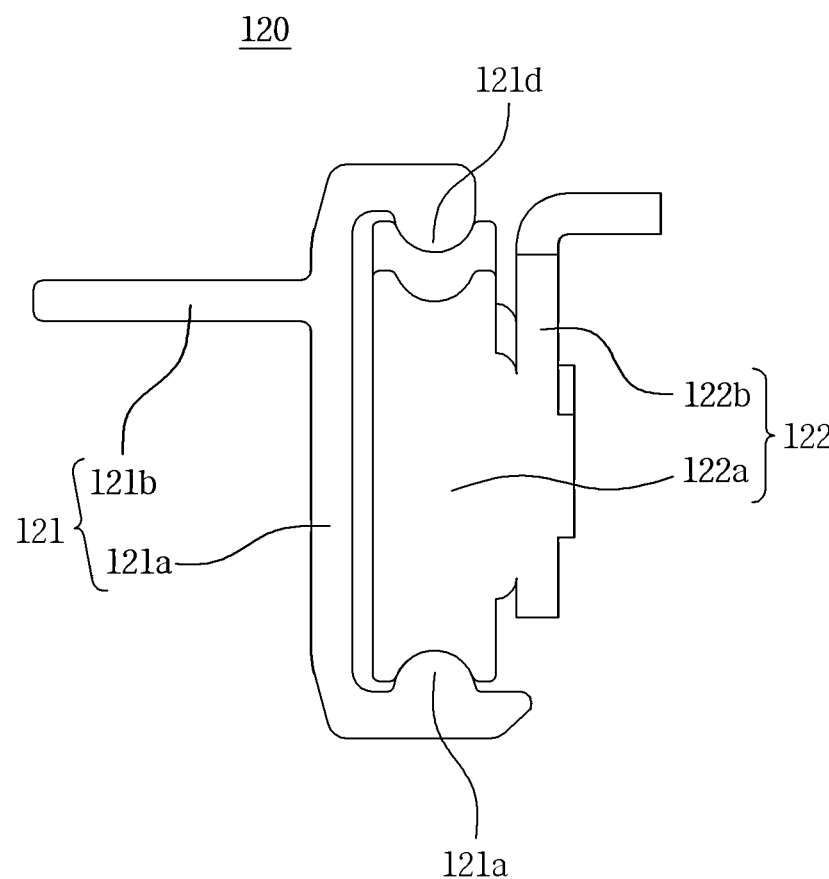

SLIDING-TYPE GLOVE BOX

CROSS-REFERENCE TO RELATED APPLICATIONS

This is a National Stage application of PCT international application PCT/KR2022/003554 filed on Mar. 15, 2022, which claims the priority of Korean Patent Application No. 10-2021-0034805 filed Mar. 17, 2021, which are incorporated herein by reference in their entireties.

TECHNICAL FIELD

The present disclosure relates to a sliding-type glove box. More specifically, the present disclosure relates to a sliding-type glove box configured to be moved on a dashboard in a sliding manner, thereby being capable of being opened and closed.

BACKGROUND ART

Generally, a dashboard in which an instrument device, an operation switch, an audio system, and so on are installed is provided at a front portion of an interior of a vehicle.

In addition, a glove box for storing goods used inside a vehicle is installed at a first side of the instrument panel, that is, at a passenger seat side, such that the glove box can be opened and closed.

The glove box may include a housing mounted in the dashboard, a storing part mounted inside the housing, and a front panel mounted on a front surface portion of the storing part.

Meanwhile, the storing part is configured to be opened and closed by being rotated in the housing.

Recently, as an interior space of a vehicle has been expanded, a glove box configured to be opened or closed by being rectilinearly reciprocated on a dashboard in a sliding manner is applied to the vehicle.

The sliding-type glove box as described above is configured such that a storing part is opened or closed by being rectilinearly moved on the dashboard along a guide rail.

However, in the existing sliding-type glove box, there is a problem that the storing part is shaken in up and down directions while the storing part is pulled out from the housing or the storing part is inserted into the housing. That is, there is a problem that the storing part is shaken upward or downward while the storing part is rectilinearly reciprocated.

In addition, the existing sliding-type glove box has a structure in which the storing part is difficult to be completely separated on the dashboard.

The housing mounted in the dashboard has to be separated from the dashboard first for performing repair or replacement of the storage part. However, since the housing is coupled to the dashboard by a fastening means while being disposed inside the dashboard, a work process in which the dashboard is separated from a vehicle body first is required to be performed.

However, since the process is very difficult for ordinary people to perform, a skilled vehicle mechanic is required and cost is incurred accordingly for repair or replacement.

Furthermore, the conventional sliding-type glove box is configured such that guide rails are provided on opposite side portions of the storing part so as to support the load of the storing part. Therefore, there are problems in that the internal space of the storing part is reduced due to the volume occupied by the guide rails, and the guide rails are exposed to the outside of the housing when the storing part is opened, which is unsightly.

Therefore, the present applicant has developed a glove box configured such that only a first side bottom portion in a longitudinal direction of a storing part is connected to rails so that the rails are not exposed to the outside of the housing when the storing part is pulled out from the housing.

As described above, the glove box in which the rails are mounted on a bottom surface of the storing part has an advantage of maintaining an aesthetic appearance of the interior space of the vehicle. However, there is a problem that the storing part is shaken in a width direction when a user slidably moves the storing part from the housing. That is, since the guide rail is mounted only on a lower portion of the storing part, a situation in which the storing part is shaken in left and right directions when the storing part is rectilinearly reciprocated occurs, which causes noise that is a problem.

Accordingly, in order to solve the problems described above, the present applicant has proposed the present disclosure, and as related conventional technology literature, 'OPERATION DEVICE OF ELECTRIC SLIDING GLOVE BOX FOR VEHICLE' is disclosed in Korean Patent No. 10-2082171.

DISCLOSURE

Technical Problem

Accordingly, the present disclosure has been made keeping in mind the above problems occurring in the related art, and an objective of the present disclosure is to provide a sliding-type glove box configured such that a storing part is capable of being easily separated from a housing without separating the housing from a dashboard.

In addition, another objective of the present disclosure is to provide a sliding-type glove box configured to limit a moving distance of a storing part that moves along a guide rail and to prevent shaking of the storing part in a width direction.

Technical Solution

In order to achieve the objectives described above, there is provided a sliding-type glove box including: a housing mounted in a dashboard, a pair of rail parts provided in an inner space of the housing, and a storing part capable of being pulled out in a sliding manner by being moved along the rail parts, wherein each of the rail parts includes: a stationary rail mounted on the housing; and a moving rail having a length shorter than a length of the stationary rail, the moving rail being provided such that the moving rail is capable of being moved along the stationary rail while the moving rail is in a state in which the moving rail is connected to a bottom portion of the storing part.

In addition, the stationary rail may include: a guide frame providing a space in which the moving rail is accommodated and is capable of being moved; and a coupling frame provided on the guide frame and coupled to the housing.

In addition, the guide frame may include a pair of guide protrusions in rolling contact with the moving rail, and the pair of guide protrusions may be formed along a longitudinal direction of the guide frame while the pair of guide protrusions is in a state in which the pair of guide protrusions is spaced apart from each other.

In addition, the moving rail may include: a plurality of wheels disposed in a space formed by the guide frame, the plurality of wheels being capable of being moved along the longitudinal direction of the guide frame; and a moving member on which the plurality of wheels is mounted such that the plurality of wheels is capable of being rotated, and the plurality of wheels may be disposed along a longitudinal direction of the moving member while the plurality of wheels is spaced apart from each other, and may be in rolling contact with any one of the guide protrusions among the pair of guide protrusions formed on the guide frame.

In addition, the moving member may be coupled to a connection member provided on the bottom portion of the storing part.

In addition, a stopper configured to limit a moving distance of the storing part may be detachably provided on the stationary rail, and the stopper may be mounted on a connection piece provided on a first end side in a longitudinal direction of the stationary rail.

In addition, the stopper may have a shape connecting each distal end in the longitudinal direction of a pair of stationary rails to each other, and may include: a first coupling member detachably coupled to the connection piece; a blocking member which is integrally connected to the first coupling member and which extends in a direction in which the pair of stationary rails faces each other, thereby blocking the moving rail from being separated toward an outside of a first end portion in the longitudinal direction of the moving rail; a second coupling member integrally connected to the blocking member and coupled to a front surface of a bottom portion side of the housing; and a supporting member integrally connected to the second coupling member and configured to support the bottom portion of the storing part, the storing part being pulled out from the housing and opened.

In addition, a fixing pin inserted into a sway prevention hole formed in the blocking member may be provided on a front surface portion of the connection member.

In addition, a buffer member in contact with a rear surface of the blocking member when the storing part is slidably moved and exposed to an outside of the housing may be provided on a front surface portion of the connection member.

In addition, in a state in which the guide protrusions are partially inserted into annular grooves formed on the wheels, when rotation centers of the wheels are assumed as A while the guide protrusions and inner circumferential surfaces of the wheels sectioning the annular grooves are in point contact with or in line contact with each other, the wheels may be in contact with the guide protrusions after the wheels are moved by 0.1 mm to 2 mm from the rotation centers A toward a direction in which the guide protrusions are disposed.

Advantageous Effects

In the sliding-type glove box according to the present disclosure, since a structure in which the moving rail having the plurality of wheels is rectilinearly reciprocated stably along the stationary rail is provided, the storing part is capable of being easily pulled out from the housing, and also the storing part is capable of being prevented from being swayed due to external impact or shaking.

In addition, in the sliding-type glove box according to the present disclosure, since a structure in which the storing part is capable of being separated from the housing is provided, a user is capable of being easily performing replacement work or repair work.

In addition, in the sliding-type glove box according to the present disclosure, even when the storing part is exposed and opened from the housing, the rail that is used to pull out the storing part is not exposed to the outside, so that aesthetic appearance of the vehicle may be maintained without being deteriorated.

DETAILED DESCRIPTION OF DRAWINGS

FIG. 7 is a perspective view illustrating a pair of rail parts according to an embodiment of the present disclosure.

FIG. 8 is a perspective view illustrating a stationary rail according to an embodiment of the present disclosure.

FIG. 9 is a perspective view illustrating a moving rail according to an embodiment of the present disclosure.

FIG. 10 is a cross-sectional perspective view illustrating a state in which wheels and guide protrusions are in contact with each other according to an embodiment of the present disclosure.

FIG. 11 is a view illustrating the rail part in FIG. 10 viewed from the front.

MODE FOR INVENTION

Advantages and features of the present disclosure, and methods of achieving the same will become apparent with reference to the embodiments described below in detail in conjunction with the accompanying drawings.

However, the present disclosure is not limited to the embodiments disclosed below, but may be implemented in various different forms. The present embodiments are intended to complete the disclosure of the present disclosure and provided to fully inform the skilled in the art to which the disclosure pertains of the scope of the disclosure. The disclosure is defined only by the scope of the claims.

Hereinafter, a sliding-type glove box according to an embodiment of the present disclosure will be described in detail with reference to FIG. 1 to FIG. 11. In a description of the present disclosure, a detailed description of related known functions or configurations will be omitted to avoid making the essence of the present disclosure unclear.

As illustrated in FIG. 1 to FIG. 11, a sliding-type glove box 100 according to an embodiment of the present disclosure may include a housing 110 mounted in a dashboard (not shown), a pair of rail parts 120 provided inside the housing 110, and a storing part 130 which can be pulled out in a sliding manner by being moved along the rail parts 120.

Figure 1:
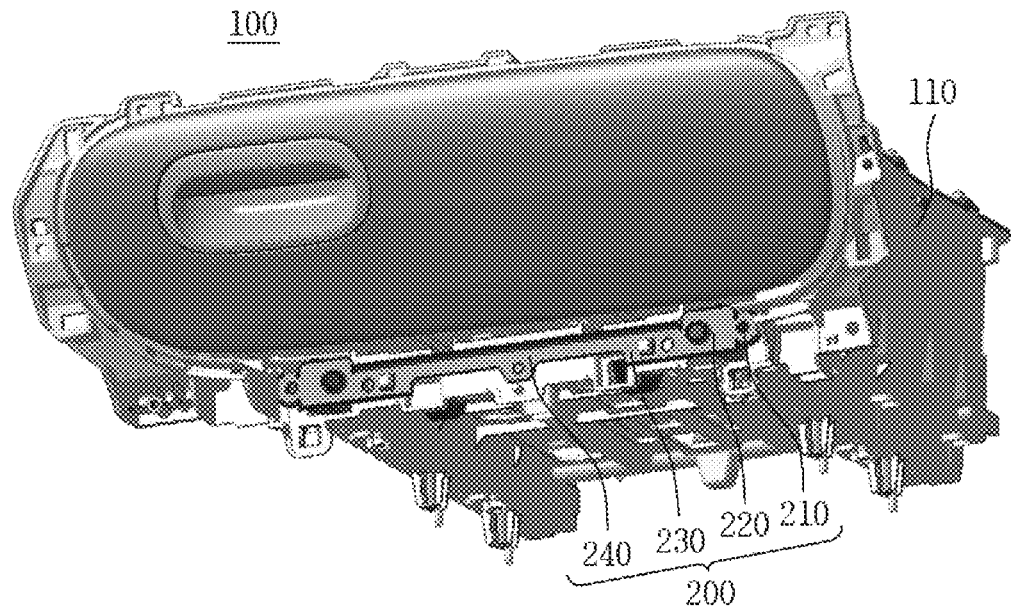
FIG. 1 is a perspective view illustrating a sliding-type glove box according to an embodiment of the present disclosure.
Figure 2:
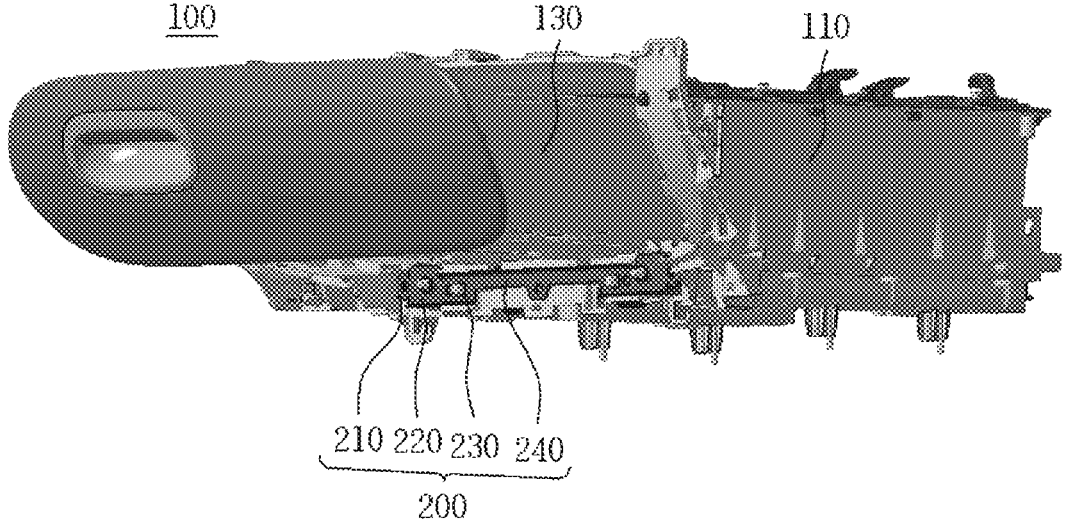
FIG. 2 is a perspective view illustrating a state in which a storing part according to an embodiment of the present disclosure is pulled out from a housing.
Figure 3:
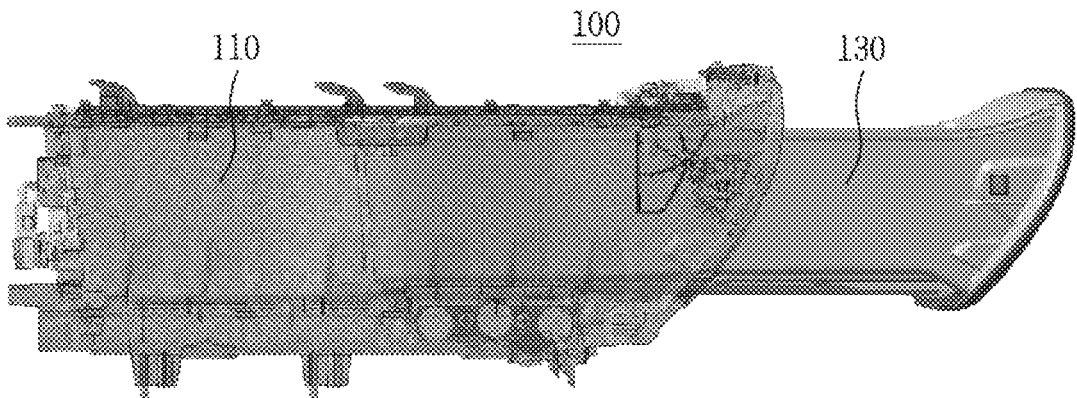
FIG. 3 is a side view illustrating a state in which the storing part according to an embodiment of the present disclosure is pulled out from the housing.
Figure 4:
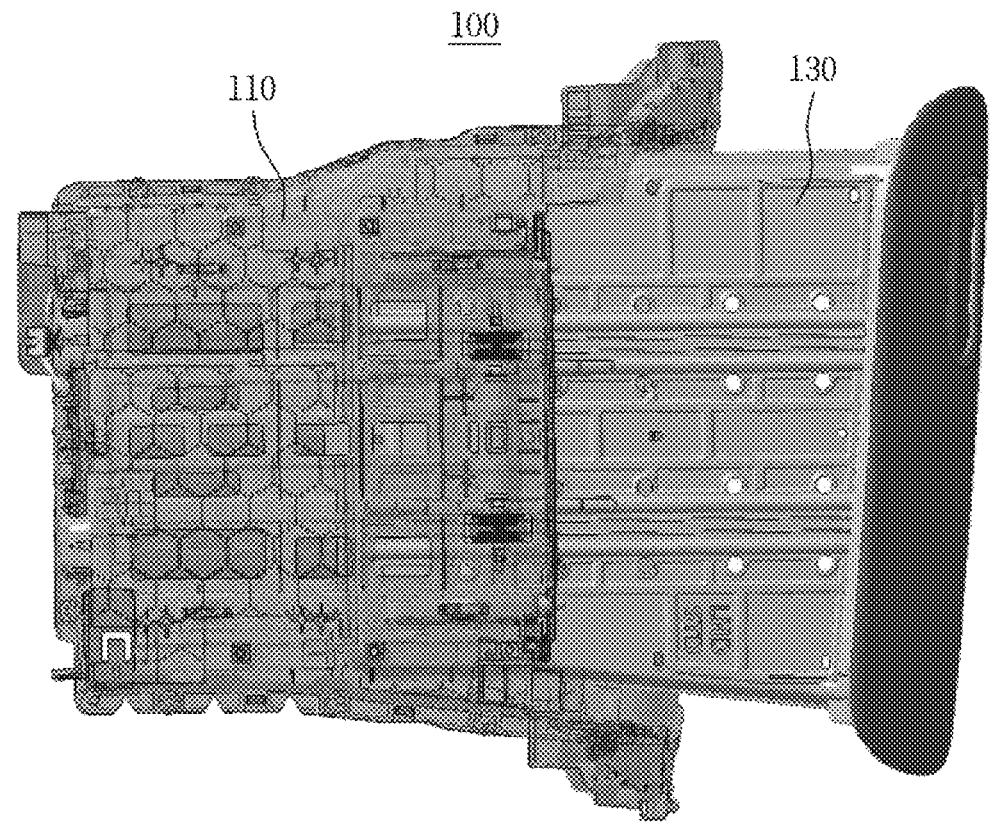
FIG. 4 is a bottom view of the sliding-type glove box illustrated in FIG. 3.

First, as described above, the housing 110 may be a component mounted in the dashboard. Such a housing 110 is provided with a space part in which the storing part 130 is capable of being accommodated. That is, as illustrated in FIG. 2 to FIG. 4, the storing part 130 may be pulled out in a sliding manner by being moved on the housing 110.

The pair of rail parts 120 may be a component that allows the storing part 130 to be slidably moved on the housing 110.

The rail parts 120 may be disposed in the space part formed in the housing 110.

As illustrated in FIG. 7 to FIG. 9, each of the rail parts 120 may include: a stationary rail 121 mounted in the housing 110; and a moving rail 122 having a length shorter than a length of the stationary rail 121, the moving rail 122 being provided such that the moving rail 122 is capable of being moved along the stationary rail 121 while being in a state in which the moving rail 122 is connected to a bottom portion of the storing part 130.

As described above, the stationary rail 121 is a component mounted in the housing 110, and maintains a fixed state regardless of the sliding movement of the storing part 130.

As illustrated in FIG. 7 and FIG. 8, the stationary rail 121 may include: a guide frame 121a providing a space in which the moving rail 122 is capable of being accommodated and moved; and a coupling frame 121b which is provided so as to be integrally connected to the guide frame 121a and which is coupled to the housing 110.

The guide frame 121a may have a 'C' shaped cross section. As described above, a 'C' shaped groove sectioned by the guide frame 121a may be the space in which the moving rail 122 is accommodated and moved.

The guide frame 121a may include a pair of guide protrusions 121c and 121d. The pair of guide protrusions 121c and 121d may be provided on a bottom surface and a ceiling surface of the guide frame 121a that sections the 'C' shaped groove. That is, as illustrated in FIG. 8, any one of the guide protrusion 121c among the pair of guide protrusions 121c and 121d may be formed on the bottom surface of the guide frame 121a. In addition, as illustrated in FIG. 8, the remaining guide protrusion 121d may be formed on the ceiling surface of the guide frame 121a.

The pair of guide protrusions 121c and 121d may be formed along a longitudinal direction of the guide frame 121a. Furthermore, in an embodiment of the present disclosure, it is illustrated in the drawings that the pair of guide protrusions 121c and 121d has a semicircular cross-sectional shape.

The pair of guide protrusions 121c and 121d configured as described above is configured to minimize a sway generated while the moving rail 122 that will be described later is rectilinearly reciprocated along the longitudinal direction of the guide frame 121a, and is also configured to prevent the moving rail 122 from being separated from the 'C' shaped groove that is sectioned by the guide frame 121a.

The coupling frame 121b may be disposed on an opposite side of the groove formed by the guide frame 121a.

The coupling frame 121b is integrally connected to the guide frame 121a, and may be provided along the longitudinal direction of the guide frame 121a. Meanwhile, in the coupling frame 121b, a plurality of fastening holes used so as to couple the coupling frame 121b to the housing 110 is formed.

The stationary rail 121 configured as described above allows the moving rail 122 and the storing part 130 to be stably rectilinearly reciprocated.

The moving rail 122 may include: a plurality of wheels 122a which is disposed in the 'C' shaped groove sectioned by the guide frame 121a and which is capable of being moved along the longitudinal direction of the guide frame 121a; and a moving member 122b mounted such that the plurality of wheels 122a is capable of being rotated.

The plurality of wheels 122a may be spaced apart from each other and may be disposed along a longitudinal direction of the moving member 122b, and may be in rolling contact with any one of the guide protrusions 121c and 121d among the pair of guide protrusions 121c and 121d formed on the guide frame 121a.

On an outer circumferential surface of each of the wheels 122a, an annular groove into which the guide protrusions 121c and 121d are capable of being inserted is formed.

In addition, in an embodiment of the present disclosure, it is illustrated in the drawings that three wheels 122a are provided on the moving member 122b, but the number of the wheels 122a is not limited thereto. That is, two wheels 122a or at least four wheels 122a may be provided on the moving member 122b.

Meanwhile, the plurality of wheels 122a disposed on the moving member 122b is configured such that the wheels 122a are alternately in contact with the pair of guide protrusions 121c and 121d formed on the guide frame 121a.

That is, the wheel 122a disposed on a first end in the longitudinal direction of the moving member 122b may be in rolling contact with the guide protrusion 121c formed on the bottom surface of the guide frame 121a, the wheel 122a disposed on a middle end in the longitudinal direction of the moving member 122b may be in rolling contact with the guide protrusion 121d formed on the ceiling surface of the guide frame 121a, and the wheel 122a disposed on a second end in the longitudinal direction of the moving member 122b may be in rolling contact with the guide protrusion 121c formed on the bottom surface of the guide frame 121a. As illustrated in FIG. 9, the plurality of wheels 122a is alternately provided on the moving member 122b such that rotation centers of the wheels 122a are different from each other.

As described above, the reason why only any one of the guide protrusions 121c and 121d among the pair of guide protrusions 121c 121d is configured to be in rolling contact with the wheels 122a is to allow the moving rail 122 to be smoothly rectilinearly moved.

That is, in order to minimize a frictional force generated between the wheels 122a and the guide protrusions 121c and 121d during a process of moving the storing part 130, it is preferable that any one of the guide protrusions 121c and 121d among the pair of guide protrusions 121c and 121d is in rolling contact with the wheels 122a.

In addition, when all the wheels 122a are in a state in which one of the wheels 122a is in rolling contact with all of the pair of guide protrusions 121c and 121d, load generated when a vehicle is shaken is directly transferred to the guide frame 121a through the storing part 130, the moving member 122b, and the wheels 122a, so that the guide frame 121a may be deformed or damaged.

Therefore, from the viewpoint of preventing the guide frame 121a from being deformed or damaged by external impact or shaking, it is preferable that the guide protrusions 121c and 121d are in rolling contact with the plurality of wheels 122a as in the same manner.

The moving member 122b may have a plate shape, and has a length shorter than a length of the guide frame 121a.

The moving member 122b may be coupled to a connection member 131 provided on the bottom portion of the storing part 130 while being in a state in which the moving member 122b supports the plurality of wheels 122a such that the plurality of wheels 122a is capable of being rotated. Therefore, the storing part 130 may be slidably moved in the housing 110 by each of the rail parts 120 configured as described above.

Meanwhile, the degree to which the plurality of wheels 122a provided on the moving member 122b is in close contact with the guide protrusions 121c and 121d provided on the guide frame 122 has a considerably important effect on the mobility of the storing part 130. For example, when the degree to which the wheels 122a are in close contact with the guide protrusions 121c and 121d is small, there is a problem that shaking occurs during a process in which the storing part 130 is rectilinearly reciprocated. Conversely, when the degree to which the wheels 122a are in close contact with the guide protrusions 121c and 121d is large, there is a problem that the storing part 130 may not rectilinearly reciprocated smoothly due to a frictional force between the wheels 122a and the guide protrusions 121c and 121d.

Therefore, it is preferable that the wheels 122a and the guide protrusions 121c and 121d are in close contact with each other in consideration of mobility and movability of the storing part 130.

As described above, the guide protrusions 121c and 121d have the semicircular cross-sectional shapes, and correspondingly, the annular grooves formed on the circumferential surfaces of the wheels 122a have semicircular cross-sectional shapes.

In a state in which the guide protrusions 121c and 121d are partially inserted into the annular grooves formed on the wheels 122a, when the rotation centers of the wheels 122a are assumed as A while the protrusions 121c and 121d and inner circumferential surfaces of the wheels 122a sectioning the annular grooves are in point contact with or in line contact with each other, it is preferable that the wheels 122a are in contact with the guide protrusions 121c and 121d after the wheels 122a are moved by 0.1 mm to 2 mm from the rotation centers A toward a direction in which the guide protrusions 121c and 121d are disposed. Then, as illustrated in FIG. 10 and FIG. 11, the wheels 122a and the guide protrusions 121c and 121d may be in close contact with each other in a state in which the wheels 122a and the guide protrusions 121c and 121d are in surface contact with each other.

That is, as illustrated in FIG. 10 and FIG. 11, it is preferable that the wheels 122a mounted on the guide frame 121 are in surface contact with the guide protrusions 121c and 121d by being moved toward the guide protrusions 121c and 121d by 0.1 mm to 2 mm from a place where the guide protrusions 121c and 121d are inserted into the annular grooves of the wheels 122a and are firstly in contact with the inner circumferential surfaces of the wheels 122a.

Therefore, as illustrated in FIG. 10, the plurality of wheels 122a mounted on the moving member 122b are set such that positions of the rotation centers of the plurality of wheels 122a are moved upward or downward from a center in a width direction of the moving member 122b to a range of 0.1 mm to 2 mm.

As described above, when the wheels 122a and the guide protrusions 122c and 122d overlap by 0.1 mm to 2 mm, a situation in which the storing part 130 is moved at an unintentional speed or is shaken in a vertical direction may be prevented.

Figure 6:
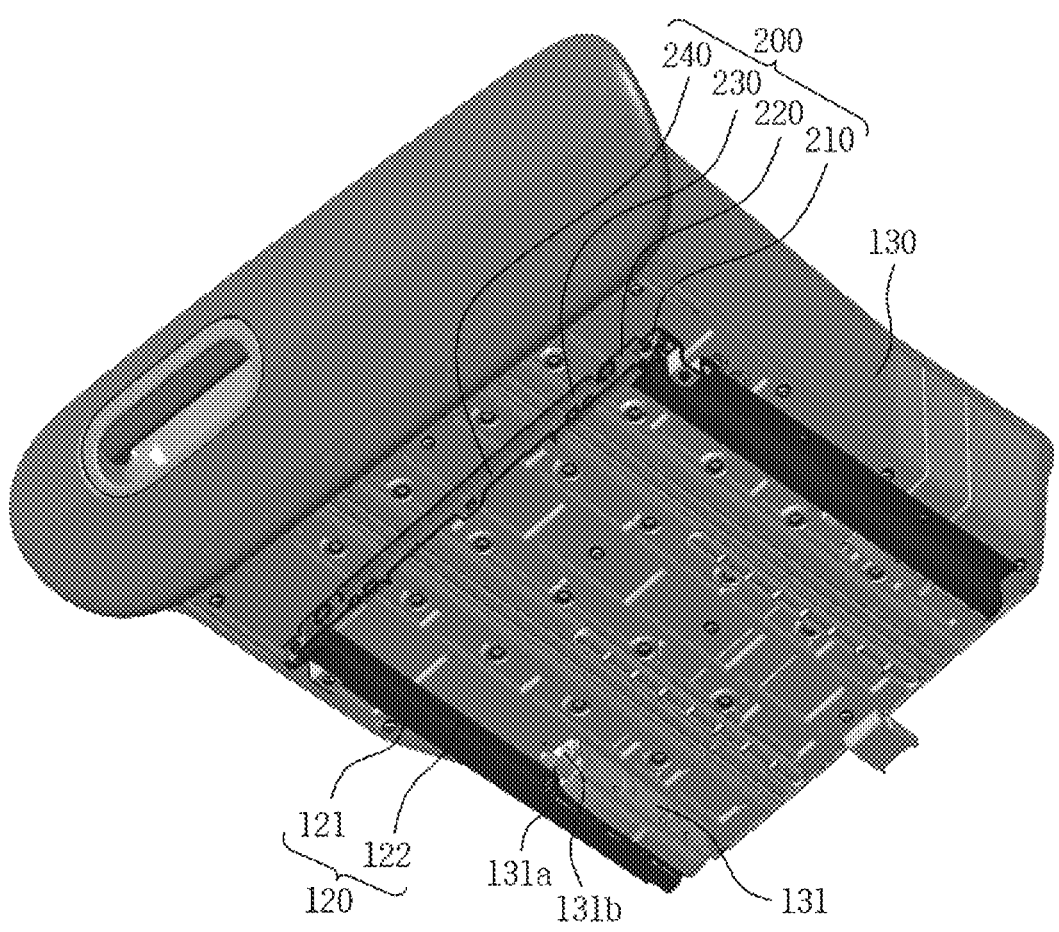
FIG. 6 is a perspective view illustrating a bottom portion of the sliding-type glove box according to an embodiment of the present disclosure in which the housing is removed.

Meanwhile, as illustrated in FIG. 6, the sliding-type glove box 100 according to an embodiment of the present disclosure may include a stopper 200 provided on a first end portion in a longitudinal direction of the stationary rail 121 and configured to limit a moving distance of the storing part 130.

The stopper 200 may be detachably mounted on a connection piece 123 provided on a first end side in the longitudinal direction of each of the stationary rails 121.

The stopper 200 may have a plate shape that connects first end portions in the longitudinal direction of each of the stationary rails 121 to each other, the first end portions being disposed to be spaced apart from each other.

That is, a first end portion in a longitudinal direction of the stopper 200 may be connected to the stationary rail 121 at a first side among the pair of stationary rails 121, and a second end portion in the longitudinal direction of the stopper 200 may be connected to the stationary rail 121 at a second side among the pair of stationary rails 121.

The stopper 200 may include: a first coupling member 210 detachably coupled to the connection piece 123; a blocking member 220 which is integrally connected to the first coupling member 210 and which extends in a direction in which the pair of stationary rails 121 are facing each other, the blocking member 220 being configured to block the moving rail 122 from being separated toward an outside of the first end portion in the longitudinal direction of the stationary rail 122; a second coupling member 230 integrally coupled to the blocking member 220 and coupled to a front surface of a bottom portion side of the housing 110; and a supporting member 240 integrally connected to the second coupling member 230 and configured to support the bottom portion of the storing part 130 that is pulled out from the housing and opened.

The first coupling member 210 may be coupled to the connection piece 123 by using a known fastening means such as a bolt, a nut, a screw, and so on. Therefore, the first coupling member 210 and the connection piece 123 are each provided with a fastening hole into which the fastening means is capable of being inserted.

For reference, in order for a worker to easily couple the first coupling member 210 of the stopper 200 to the connection piece 123 and to separate the storing part 130 from the housing 110, it is preferable that the connection piece 123 is provided on an opposite side of the groove formed by the guide frame 121a. That is, it is preferable that the connection piece 123 is exposed outside so that the worker easily performs fastening work between the connection piece 123 and the first coupling member 210 from outside the stationary rail 121, and it is preferable that the connection piece 123 is provided on a position where the connection piece 123 does not interfere with the movement of the moving rail 122 in order to completely pull out the storing part 130 from the housing 110 so as to replace or repair the storing part 130.

When the connection piece 123 is formed such that the connection piece 123 is bent in a direction in which the pair of stationary rails 121 faces each other, the worker has no choice but to perform bolting work of the first coupling member 210 and the connection piece 123 with difficulty. This is because the connection piece 123 is not exposed to the naked eye. In addition, when the connection piece 123 is formed such that the connection piece 123 is bent in a direction in which the pair of stationary rails 121 faces each other from the first end portions in the longitudinal direction of the stationary rails 121, the moving rails 122 are prevented from being separated toward the first side ends in the longitudinal direction of the stationary rails 121, so that the worker cannot separate the storing part 130 on the housing 110.

Therefore, it is preferable that the connection piece 123 is provided on a direction side in which the pair of stationary rails 121 is not facing each other at the first end portions in the longitudinal direction of the stationary rails 121.

The blocking member 220 prevents the moving rail 122 from being separated from the groove portion having the 'C' shaped cross section formed on the guide frame 121a of the stationary rail 121 when the moving rail 122 is moved toward the first side in the longitudinal direction from the second side in the longitudinal direction of the stationary rail 122 so that the storing part 130 is opened.

In other words, the blocking member 220 prevents the moving rail 122 from being separated from the stationary rail 121 when the storing part 130 is pulled out from the housing 110 and is fully opened.

The second coupling member 230 is coupled to the bottom portion of the housing 110, thereby serving to strengthen a supporting force of the blocking member 220. That is, the second coupling member 230 may be coupled to a bottom surface of the bottom portion of the housing 110 by a fastening means. Therefore, a fastening hole into which the fastening means such as a bolt or a screw is capable of being inserted is each provided on a front surface of the bottom portion of the second coupling member 230 and the housing 110.

The supporting member 240 connects the second coupling members 230 respectively provided on the pair of stationary rails 121 to each other, and is configured to support the bottom portion of the storing part 130 when the storing part 130 is opened in the housing 110 as illustrated in FIG. 3.

When the storing part 130 is required to be separated on the housing 110 so that the user replaces or repairs the storing part 130, the stopper 200 configured as described above is capable of being separated by releasing work of the fastening means from the first end side in the longitudinal direction of the stationary rail 121. That is, when the fastening member fastening the connection piece 123 and the first coupling member 210 to each other is separated from the connection piece 123 and the first coupling member 210, the storing part 130 becomes in a state in which storing part 130 is capable of being separated from the housing 110.

Meanwhile, as illustrated in FIG. 6, the connection member 131 may include a pair of connection members 131 provided on the bottom portion of the storing part 130 and coupled to the moving members 122b of the stationary rails 122.

When the moving rail 122 is moved in the longitudinal direction of the stationary rail 121 in order for the storing part 130 to be opened from the housing 110, the storing part 130 is capable of being opened while a part of the storing part 130 in which the connection member 131 is not disposed is only exposed to the outside of the housing 110 as illustrated in FIG. 2 and FIG. 3. At this time, by an arrangement relationship between the connection member 131 and the moving rail 122, the pair of rail parts 120 is not exposed to the outside even though the storing part 130 is opened on the housing 110.

In addition, as illustrated in FIG. 6, a fixing pin 131a may be provided on a front surface portion of the connection member 131.

Figure 5:
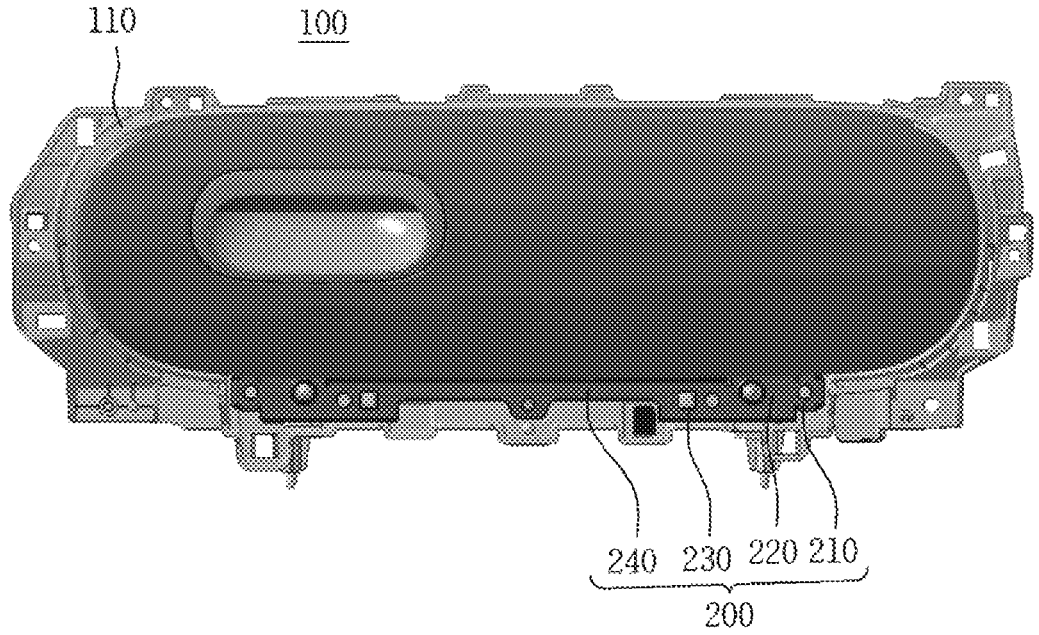
FIG. 5 is a front view of the sliding-type glove box illustrated in FIG. 2.

As illustrated in FIG. 2 and FIG. 5, the fixing pin 131a may be inserted into a sway prevention hole formed in the blocking member 220 when the storing part 130 is moved and opened on the housing 110.

The fixing pin 131a and the sway prevention hole are configured to prevent the storing part 130 from being swayed due to external impact or shaking when the storing part 130 is opened.

That is, as illustrated in FIG. 2, when the moving rail 122 is moved toward the first end side in the longitudinal direction of the stationary rail 121 in order to fully open the storing part 130, the first side end in the longitudinal direction of the moving rail 122 is in contact with a rear surface of the blocking member 220 of the stopper 200. At this time, in order for the storing part 130 to be prevented from being swayed in the width direction thereof, the fixing pin 131a formed on the front surface portion of the connection member 131 may be inserted into the sway prevention hole formed in the blocking member 220.

When the fixing pin 131a is inserted into the sway prevention hole of the blocking member 220, the storing part 130 that is in the opened state may be prevented from being swayed in the width direction (left and right directions) thereof.

In other words, the blocking member 220 of the stopper 200 serves to prevent the storing part 130 in the opened state from being further moved along the longitudinal direction thereof, and the sway prevention hole formed in the blocking member 220 and the fixing pin 131a formed in the connection member 131 serve to prevent the storing part 130 in the opened state from being swayed along the width direction thereof.

Therefore, the stopper 200 according to an embodiment of the present disclosure serves to limit the movement of the storing part 130 in the longitudinal direction thereof, and also serves to prevent the storing part 130 from being swayed in the width direction thereof when the storing part 130 is moved from the housing 110 and opened.

In addition, as illustrated in FIG. 6, a buffer member 131b in contact with the rear surface of the blocking member 220 when the storing part 130 is slidably moved and exposed to the outside of the housing 110 may be provided on the front surface portion of the connection member 131.

The buffer member 131b may be provided on the front surface portion of the connection member 131 while the buffer member 131b is positioned above a forming position of the fixing pin 131a, and may have a protrusion length in contact with the rear surface of the blocking member 220 when the fixing pin 131a is inserted into the sway prevention hole.

For reference, the buffer member 131b may be manufactured of material having elasticity, such as a rubber material, silicone, a synthetic resin material, and so on.

Therefore, when the storing part 130 is opened, a force transmitted to the blocking member 220 of the stopper 200 is relieved, so that deformation or damage to the blocking member 220 may be prevented.

Although detailed exemplary embodiments according to the present disclosure have been described so far, obviously, various modifications may be made without departing from the scope of the present disclosure.

Therefore, the scope of the present disclosure should not be limited to the described exemplary embodiments, and should be determined not only by the scope of the claims to be described later, but also by the scope and equivalents of the claims.

INDUSTRIAL APPLICABILITY

The present invention may be applied and sold in the automotive industry.

The invention claimed is:
1. A sliding-type glove box comprising a housing mounted in a dashboard, a pair of rail parts provided in an inner space of the housing, and a storing part capable of being pulled out in a sliding manner by being moved along the rail parts, wherein each of the rail parts comprises:

a stationary rail mounted on the housing; and a moving rail having a length shorter than a length of the stationary rail, the moving rail being provided such that the moving rail is capable of being moved along the stationary rail while the moving rail is in a state in which the moving rail is connected to a bottom portion of the storing part, a stopper configured to limit a moving distance of the storing part, wherein the stopper is detachably provided on the stationary rail and is mounted on a connection piece provided on a first end side in a longitudinal direction of the stationary rail, wherein the stopper has a shape connecting each distal end in the longitudinal direction of a pair of stationary rails to each other, and comprises:

a first coupling member detachably coupled to the connection piece;

a blocking member which is integrally connected to the first coupling member and which extends in a direction in which the pair of stationary rails faces each other, thereby blocking the moving rail from being separated toward an outside of a first end portion in the longitudinal direction of the moving rail;

a second coupling member integrally connected to the blocking member and coupled to a front surface of a bottom portion side of the housing; and a supporting member integrally connected to the second coupling member and configured to support the bottom portion of the storing part, the storing part being pulled out from the housing and opened.

2. The sliding-type glove box of claim 1, wherein the stationary rail comprises:

a guide frame providing a space in which the moving rail is accommodated and is capable of being moved; and a coupling frame provided on the guide frame and coupled to the housing.

3. The sliding-type glove box of claim 2, wherein the guide frame comprises a pair of guide protrusions in rolling contact with the moving rail, and the pair of guide protrusions is formed along a longitudinal direction of the guide frame while the pair of guide protrusions is in a state in which the pair of guide protrusions is spaced apart from each other.

4. The sliding-type glove box of claim 3, wherein the moving rail comprises:

a plurality of wheels disposed in a space formed by the guide frame, the plurality of wheels being capable of being moved along the longitudinal direction of the guide frame; and a moving member on which the plurality of wheels is mounted such that the plurality of wheels is capable of being rotated, and the plurality of wheels is disposed along a longitudinal direction of the moving member while the plurality of wheels is spaced apart from each other, and is in rolling contact with any one of the guide protrusions among the pair of guide protrusions formed on the guide frame.

5. The sliding-type glove box of claim 4, wherein, in a state in which the guide protrusions are partially inserted into annular grooves formed on the wheels, when a rotation center of one of the wheel is defined while the guide protrusions and inner circumferential surfaces of the wheels sectioning the annular grooves are in point contact with or in line contact with each other, the wheels are in contact with the guide protrusions after the wheels are moved by 0.1 mm to 2 mm from the rotation centers-A toward a direction in which the guide protrusions are disposed.

6. The sliding-type glove box of claim 4, wherein the moving member is coupled to a connection member provided on the bottom portion of the storing part.

7. The sliding-type glove box of claim 6, wherein a fixing pin inserted into a sway prevention hole formed in the blocking member is provided on a front surface portion of the connection member.

8. The sliding-type glove box of claim 6, wherein a buffer member in contact with a rear surface of the blocking member when the storing part is slidably moved and exposed to an outside of the housing is provided on a front surface portion of the connection member.

* * * * *